United States Patent

Newman

[15] 3,651,595
[45] Mar. 28, 1972

[54] ELECTRIC SHRIMP TRAWL

[72] Inventor: James Lee Newman, 1321 Glen Cove, Richardson, Tex.

[22] Filed: Aug. 14, 1970

[21] Appl. No.: 63,835

[52] U.S. Cl. ................................................43/9, 43/17.1
[51] Int. Cl. ..........................................................A01k 73/02
[58] Field of Search ..........................................43/17.1, 8, 9

[56] References Cited

UNITED STATES PATENTS

| | | | |
|---|---|---|---|
| 3,312,011 | 4/1967 | Wathne et al. | 43/17.1 |
| 3,415,001 | 12/1968 | Ott et al. | 43/17.1 |
| 3,483,649 | 12/1969 | Klima et al. | 43/17.1 |
| 3,491,474 | 1/1970 | Metcalf, Jr. | 43/17.1 |

Primary Examiner—Warner H. Camp
Attorney—Richards, Harris & Hubbard

[57] ABSTRACT

A first electrode is attached to the footrope of an otter-type shrimp trawl net and a second electrode is attached to the tickler chain of the net. The two electrodes are periodically energized by a power supply located on the towing boat which charges and discharges a capacitor located on one of the otter doors of the net. The capacitor periodically discharges through the two electrodes and stimulates shrimp embedded in the surface of the sea bottom lying between the electrodes.

14 Claims, 10 Drawing Figures

Patented March 28, 1972

INVENTOR:
JAMES L. NEWMAN

Richards, Harris & Hubbard
ATTORNEYS

INVENTOR:
JAMES L. NEWMAN

Richards, Harris & Hubbard
ATTORNEYS

INVENTOR:
JAMES L. NEWMAN

Richards, Harris & Hubbard
ATTORNEYS 3,651,595

ELECTRIC SHRIMP TRAWL

The invention relates to an electric trawl, and more particularly, to an electric shrimp trawl adapted to utilize conventional structural equipment.

*Penaeus aztecus* and *Penaeus duorarum* shrimp are, by nature, nocturnal creatures. During the day, they burrow into the bottom of the sea and lie dormant. Only during the hours of darkness do they come out into the water to feed where they can be captured by a trawl net. Since shrimp boats normally operate a substantial distance from shore where it is impractical to return after each night's operation, about 50 percent of the total elapsed time of each fishing trip is not productive.

Researchers have discovered that involuntary muscular contractions occur within the body of a shrimp when it is exposed to electrical impulses. When the voltages of the pulses exceed a certain threshold and are at a certain rate, the involuntary contractions are sufficient to cause a shrimp burrowed in the sea bottom to literally hop several inches out of its hiding place into the water so that it can be caught by a net. If the voltage from end to end of the shrimp does not exceed a certain threshold, or if the pulses are too slow or too fast, or the shrimp is not exposed to the pulses for a certain period of time, the shrimp does not hop out of the sea bottom.

Electrical shrimp trawls utilizing this phenomenon have been successfully tested. In one such device, a plurality of electrodes arranged and connected to an elaborate harness network are fixed to the net to be towed along in front. The electrodes are pulsed with current to stimulate the shrimp lying in the sea bottom as they pass over. In another such device, the electrodes are arrayed parallel to the direction of travel of the shrimp boat and again connected by a harness network to the opposite sides of the trawl.

Because of expense and the complexity of rigging required, it is often desirable to provide a shrimp trawling electrode rig which is as simple as possible and which can be readily adapted to the existing structural arrangements of conventional trawl nets. Existing shrimp trawls utilize a chain called a tickler chain, attached to the otter doors and of a length about 2 feet shorter than the foot rope. This chain serves as a mechanical stimulus to shrimp on the bottom foraging for food. It is not effective on burrowed shrimp. However, by combining the tickler chain with one electrode and the footrope with the other electrode, the existing mechanical arrangement becomes an effective electrical trawl when energized with the proper electrical impulses.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
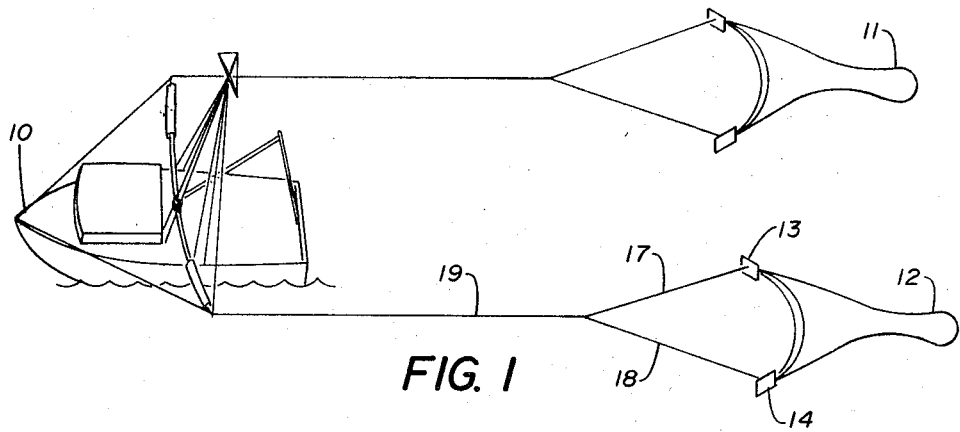
FIG. 1 illustrates a shrimp boat towing two otter trawls rigged in accordance with the present invention.
Figure 2:
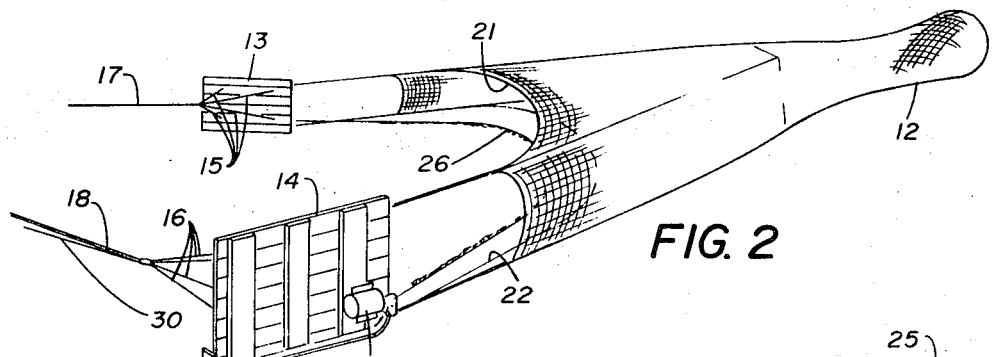
FIG. 2 is a perspective view of an electrified trawl net constructed in accordance with the invention.

Referring now to the drawings, and in particular to FIG. 1, a shrimp boat 10 is illustrated as towing first and second otter trawls 11 and 12. The otter trawl 11 is identical to the trawl 12 which is illustrated in FIG. 2. The trawl 12 includes a pair of otter doors 13 and 14 which are connected by respective door chains 15 and 16 and bridle legs 17 and 18 to a tow cable 19. A headrope 21 extends between the upper rear corners of the otter doors 13 and 14 and a footrope 22 extends between the lower rear corners of the doors. The net of the trawl extends between the headrope 21 and the footrope 22 substantially in the configuration illustrated as the net is pulled through the water by a boat 10.

Figure 3:
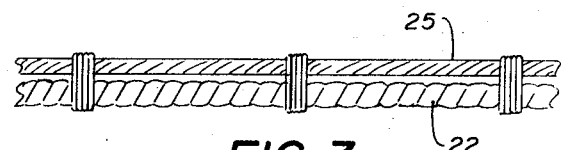
FIG. 3 is a top view of the footrope of the trawl of FIG. 2 with an electrode attached thereto in accordance with the invention.
Figure 4:
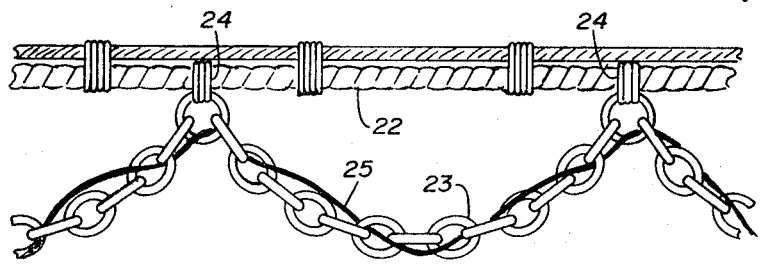
FIG. 4 is a top view of the footrope of the trawl of FIG. 2 showing a weighting chain and an electrode thereon.

As the net is pulled along, the bottom of the net should pass as close to the sea bottom as possible so that shrimp lying a short distance above the bottom will be caught. Because the net is usually trimmed to make the footrope rise off bottom, it must be held down toward the bottom by a section of footrope chain 23. FIG. 4 illustrates the loop method of rigging a footrope chain in which points on the chain 23 separated from one another a distance of from 12 to 24 inches are fixed to the footrope by binding clamps 24. The chain is clamped to dangle from the footrope in loops which extend from the footrope a distance of from 5 to 8 inches. As the trawl is dragged along the bottom of the sea, the weight of the chain 23 holds the footrope 22 relatively close to the bottom while still allowing it to ride sufficiently high from the bottom to avoid tangling in debris. The footrope arrangement of the invention, shown in FIG. 3, also includes a bare copper electrode 25 attached to the footrope by periodically spaced ring clamps. Alternatively, the footrope may be equipped with a weighting chain, as shown in FIG. 4, and the electrode 25 may be interwoven through the links of the footrope chain 23, to be further explained below, which also gives added strength to the electrode and prevents it from kinking.

As is shown in FIG. 2, the otter trawl 12 also includes a tickler chain 26 as is conventional in most trawls of this type. In conventional otter trawls, the tickler chain consists of a chain which is on the order of 2 feet shorter in length than the footrope and which is also attached to the lower rear edges of the otter doors 13 and 14. As the trawl is drawn along, the tickler chain is dragged and bounced along the sea bottom to physically contact and stimulate any shrimp which are foraging for food on the bottom into movement up into the water. Once the shrimp are off the bottom, the footrope passes beneath them and they are scooped into the net. While the "tickling" function is normally performed by a length of chain, it is to be understood that other devices such as a cable or rope could be used.

Figure 5:
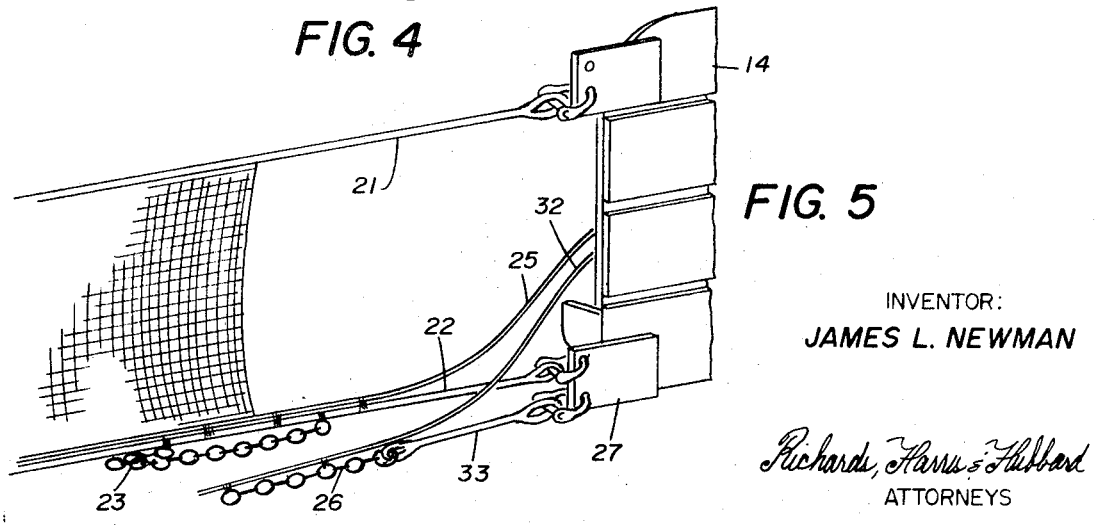
FIG. 5 is a perspective view of one of the otter doors of the trawl net of FIG. 1 showing the method of attachment and connection of the electrode structure employed.

Referring now to FIG. 5, the otter door 14 has a plate 27 containing one or more eyelets mounted on the lower rear edge thereof. The footrope 22 is affixed to one of the eyelets in the plate 27 and the tickler chain 26 is attached to another. A pulse generator 31 which is connected by a cable 30 to a power supply located on the deck of a ship is mounted on the rear side of the door 14. A bare copper electrode 32 is connected from the positive side of the pulse generator 31 and is attached to the tickler chain 26. The footrope electrode 25 is connected to the negative side of the pulse generator 31. The electrodes 25 and 32 make both the tickler chain and the footrope conductive carriers while the footrope and tickler chain protect their respective electrodes from physical damage. Both the electrodes 25 and 32 are preferably number 2 gauge 7 × 19, 133 strand bare copper cables. To provide adequate insulation between the two electrodes 25 and 32 at the door, the tickler chain 26 is attached to the plate 27, on the lower edge of the trawl door, by a short length of rope 33. The pulse generator and associated power supply equipment are preferably similar to the circuitry disclosed in an application entitled "Shrimp Fishing Apparatus," Ser. No. 883,187, filed Dec. 8, 1969, by James L. Newman and M. Marion Hawthorne.

When the pulse generator 31 is energized, it preferably produces pulses at a rate of five pulses per second which produce a pulsating electric field between the tickler chain and the footrope. As the trawl is pulled along the sea bottom, the electric current pulses are impressed into the area of sea bottom located between the tickler chain electrode and the footrope electrode. Any shrimp located within the energized area, either in the water or burrowed into the bottom will be stimulated to rise above the level of the footrope and will be swept into the net.

Since the length of the tickler chain 26 can be adjusted, the distance between the two electrodes can be varied. By changing this length and assuming a constant speed of trawling, it is possible to vary the length of time during which shrimp burrowed into the sea bottom are exposed to the electric current pulses. In mud bottoms as is customarily found along the Gulf coast, experimenters have determined that it requires from 0.3 seconds to 0.5 seconds of exposure to a pulse rate of five pulses per second to stimulate a shrimp to deburrow. When the trawl is towed at a rate of 4 knots, a minimum longitudinal separation of 3½ feet is required to stimulate the shrimp for at least 0.5 seconds. In the footrope and tickler chain electrode arrangement of the invention, as shown in FIG. 2, the tickler chain has been reduced in length from the conventional 2 feet shorter than the footrope to on the order of 6 feet shorter than the footrope which results in the electrodes 25 and 32 being separated approximately 3½ feet at the center of the trawl. In the central portion of the trawl of FIG. 5, adequate time spacing of the electrodes exists to ensure a high percentage of deburrowment of the shrimp.

Figure 6:
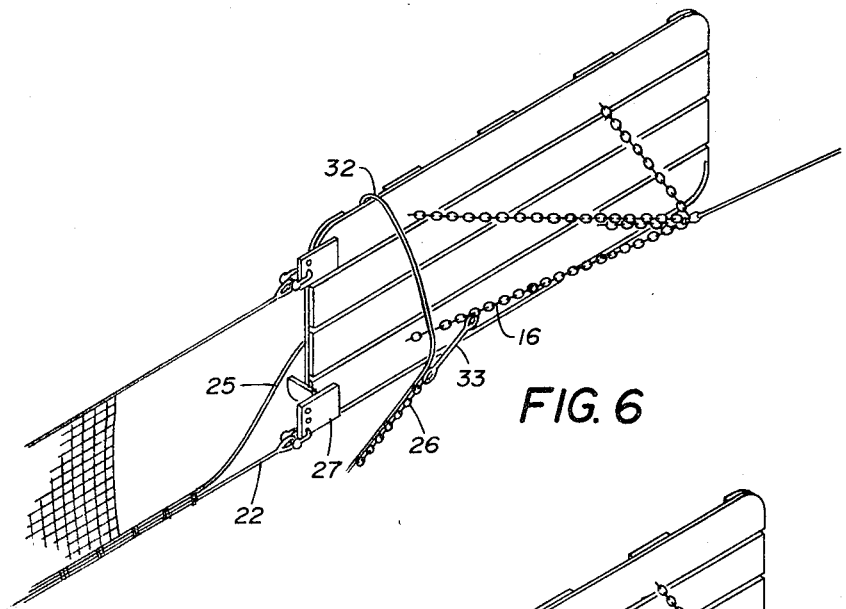
FIG. 6 is a first alternate embodiment.

Since the tickler chain and footrope electrodes are relatively close together in the area adjacent their attachment to the otter doors, the shrimp being passed over by the outer portions of the net, may not be under stimulation from the pulsating electric field for a sufficiently long period of time to stimulate them to deburrow. The overall effectiveness of the electrode arrangement of FIG. 5 may be enhanced by connecting the tickler chain and its associated electrode in a second embodiment of the invention as shown in FIG. 6. In this arrangement, the tickler chain 26 and the electrode 32 are disconnected from the plate 27 on the otter door and are instead attached by the insulative rope 33 to one of the chains 16. The point of attachment of the tickler chain is now located approximately 39 inches further forward than that of the footrope chain. This additional time spacing results in stimulation of the burrowed shrimp being passed over by the outer fringes of the trawl.

Researchers have learned that it takes somewhat longer for a shrimp under electrical stimulation to deburrow from a sandy bottom, as is often found off the coast of Florida, than from a mud bottom. For example, it may require from 0.5 to 1.0 seconds for a shrimp to escape from the harder packed bottom surface. For a trawl being towed at 4 knots, this requires that an electrode pair be spaced a total of 7 feet apart in order to stimulate the shrimp for a minimum of 1 second. The embodiment of the invention illustrated in FIG. 7 furnishes such a separation and includes a footrope 22 and tickler chain 26 both of which are attached to eyelets of the plate 27. The footrope is equipped with a positive electrode 25 and the tickler chain with a negative electrode 32. A third electrode 40 is attached to the door chain 16 at a location approximately 39 inches forward of the plate 27. The third electrode 40 is connected to the positive terminal of the pulse generator 31 so that as current pulses are produced, two electric fields will now be generated on the sea bottom; one between the footrope electrode 25 and the tickler chain electrode 32 and one between the third electrode 40 and the tickler chain electrode 32. This arrangement increases the effective area of electrical stimulation of shrimp being passed over by the trawl and is useful in areas where the bottom is sandy and longer time is required for the shrimp to escape his burrow.

Figure 7:
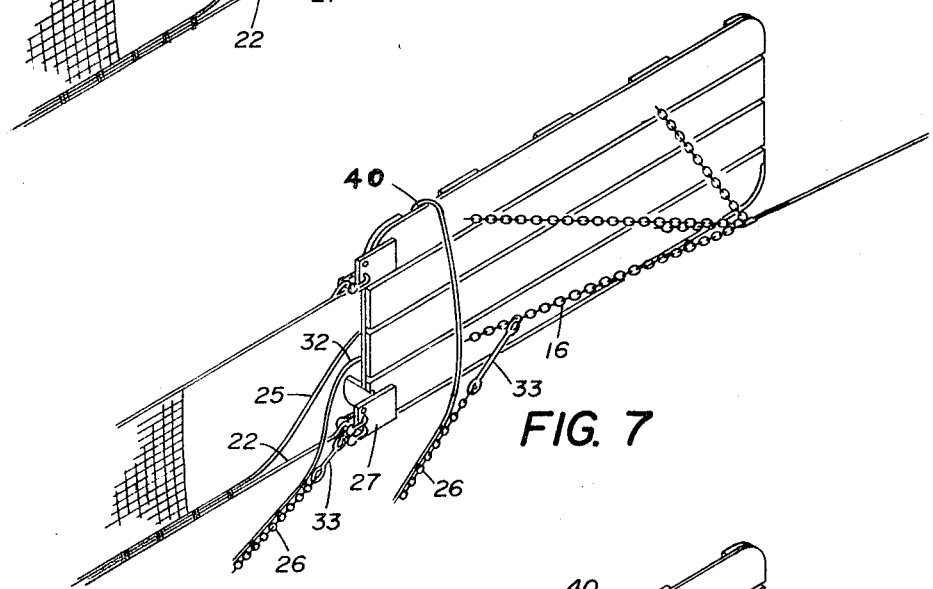
FIG. 7 is a second alternate embodiment of the invention.
Figure 8:
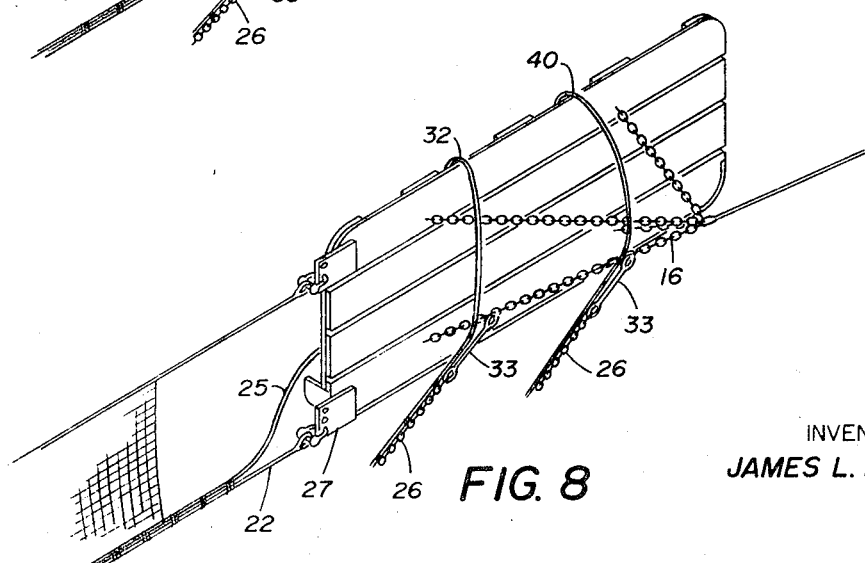
FIG. 8 is a third alternate embodiment of the invention.

The overall effectiveness of the electrode arrangement of FIG. 7 may be enhanced by connecting the electrodes in a further embodiment of the invention as shown in FIG. 8. The tickler chain 26 and its associated electrode 32 are connected to a forward point on the door chain 16, as in the embodiment of FIG. 6, and a third electrode 40 is included still further forward on the door chain 16. The footrope electrode 25 and the third electrode 40 are both connected to the positive terminal of the pulse generator 31 while the tickler chain electrode is connected to the negative terminal.

One of the principal features of the present invention is that of incorporating an electrode into a footrope of a trawl. This arrangement allows one electrode to become a permanent part of the trawl. The trawl may then be equipped with a complete electrode array when desired by merely adding the other electrode structure. The footrope electrode structure shown in FIG. 9 includes a footrope 22 connected between the otter doors 13 and 14.

Figure 10:
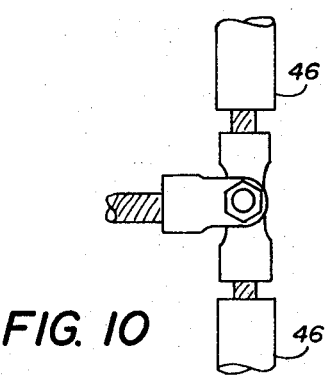
FIG. 10 is a top view of the connection between a bus conductor and an electrode.

The pulse generator 31 is attached to the otter door 14. The footrope electrode 25 is attached to the footrope 22 by a series of spaced ring clamps or by spaced ties with seine twine and is connected electrically to the negative terminal of the pulse generator 31. A plurality of additional electrodes 42–45 are arrayed in an arcuate pattern in front of the footrope 22 and footrope electrode 25. Each of the electrodes is terminated at the end farthest from the pulse generator 31 by attachment at spaced intervals to the footrope. Conventional attachment means such as a swivel and shackle can be used. At the point of attachment of both ends of electrodes 42 and 44, the footrope electrode 25 is insulated with short lengths of insulation 47. The ends of electrodes 42 and 44 closest to the pulse generator 31 are attached to the positive bus 46, as illustrated in FIG. 10, which is in turn connected to the positive output terminal of the pulse generator 31. Positive bus 46 is laced or clamped to the footrope for support. The ends of electrodes 43 and 45 closest to the pulse generator 31 are attached to the footrope electrode 25 which is in turn connected to the negative terminal of pulse generator 31.

The electrodes 25 and 42–45 are separated from one another approximately 39 inches at the center of the array. The spacing results in a distance on the order of 13 feet from the footrope electrode 25 to the front electrode 45. This spacing results in the burrowed shrimp being exposed to electrical stimulation for a maximum of 2.0 seconds when the trawl is towed at 4 knots. Researchers have shown that 2 seconds exposure to electrical pulses is sufficient to deburrow shrimp from even very hard sand or mixed sand and shell.

Figure 9:
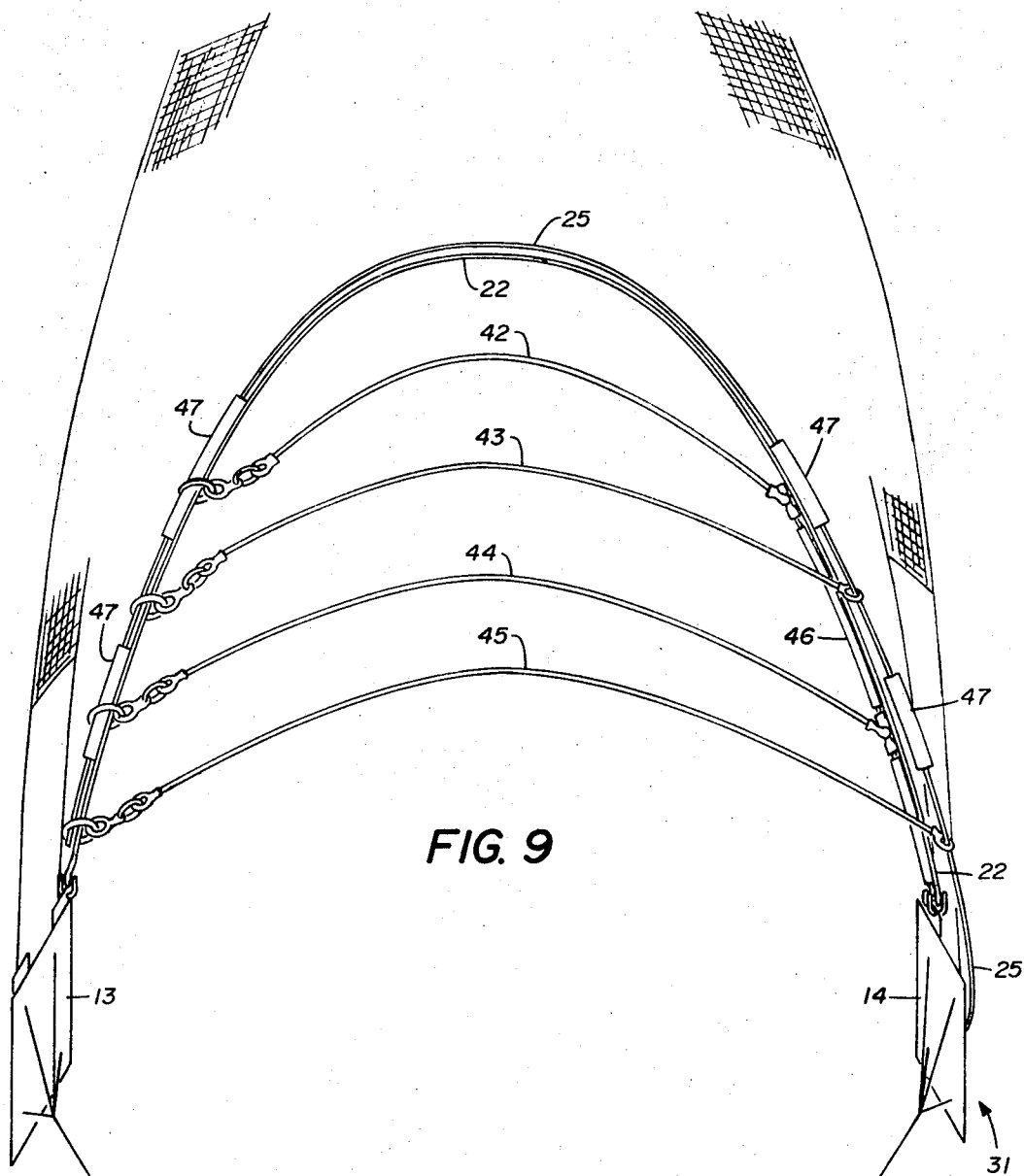
FIG. 9 is a fourth alternate embodiment of the invention.

The trawl arrangement of FIG. 9 is easily convertable from electrical to conventional since the electrodes 42–45 may be attached by swivel and shackle devices. The footrope electrode 25 is now a permanent part of the trawl and may be left in place even for non-electrical operation without the other electrodes.

It can be seen that the tickler chain electrode and footrope electrode arrangements of the present invention permit a shrimp trawl of conventional construction to be modified to electric operation with a minimum of trouble and expense. The electrodes can be easily and quickly added and removed by relatively unskilled crewmen as opposed to prior art electrode arrays which require more technical competence to install and rig.

Having described the invention in connection with certain specific embodiments thereof, it is to be understood that further modifications may now suggest themselves to those skilled in the art and it is intended to cover such modifications as fall within the scope of the appended claims.

What is claimed is:
1. An electric shrimp trawl, comprising:
a pair of otter doors;
a headrope connected between the upper rear edges of said doors, a footrope connected between the lower rear edges of said doors and a trawl net connected between said headrope and said footrope;

a tickler chain connected between said otter doors to drag along the sea bottom preceding said footrope and physically stimulate shrimp into a position in front of the net;

a first electrode attached to said footrope;

a second electrode attached to said tickler chain; and means connected to said first and second electrodes for electrically energizing said electrodes and electrically stimulating the shrimp in the area between said electrodes into a position in front of the net.

2. An electric shrimp trawl as set forth in claim 1 wherein:

said first electrode includes a bare conductor extending along and attached to said footrope; and said second electrode includes a bare conductor extending along and attached to said tickler chain.

3. An electric shrimp trawl as set forth in claim 2 wherein said footrope is attached to a point on the lower rear edge of said otter doors and said tickler chain is attached to one end of a length of insulative rope, the other end of which is attached to a point on the lower rear edge of said otter doors.

4. An electric shrimp trawl as set forth in claim 3 which also includes a third electrode electrically connected to said first electrode and attached to a point forward of the point of attachment of both said footrope and said tickler chain.

5. An electric shrimp trawl as set forth in claim 1 which also includes a footrope chain connected to weight said footrope and wherein said first electrode is attached to said footrope chain.

6. An electric shrimp trawl as set forth in claim 1 wherein said means for energizing includes a pulse generator mounted on one of said otter doors.

7. An electric shrimp trawl as set forth in claim 1 wherein said tickler chain is connected to a point forward of the point of attachment of said footrope to said otter door to provide time spacing between the outer portions of said electrodes.

8. An electric shrimp trawl as set forth in claim 7 which also includes a third electrode electrically connected to said first electrode and attached to a point forward of the point of attachment of both said footrope and said tickler chain.

9. A shrimp trawl of the type which includes a pair of otter doors, a headrope connected between the upper rear edges of said doors, a footrope connected between the lower rear edges of said doors, a tickler chain connected between the lower rear edges of said doors and a net connected between said footrope, the improvement comprising:

a pair of electrodes, the first of said electrodes attached to said footrope and the second electrode attached to said tickler chain; and means for energizing said pair of electrodes to electrically stimulate shrimp lying in the area between said tickler chain and said footrope to bring the shrimp into a position in front of the net.

10. A shrimp trawl as set forth in claim 9 which also includes:

a third electrode connected to the first electrode of said pair and attached to said otter door at a point forward of attachment of both tickler chain and footrope.

11. A shrimp trawl as set forth in claim 9 which also includes a weighting chain connected to said footrope and wherein said first electrode is attached to said footrope chain.

12. A shrimp trawl as set forth in claim 11 wherein said electrodes include bare conductive wires woven, respectively, through the link of the footrope and tickler chains.

13. A shrimp trawl of the type which includes a pair of otter doors, a headrope connected between the upper rear edges of said doors, a footrope connected between the lower rear edges of said doors, a tickler chain connected between the lower rear edges of said doors, and a net connected between said headrope and said footrope, the improvement comprising:

a first electrode attached to said footrope;

a plurality of additional electrodes in front of said first electrode and spaced from one another; and means for energizing alternate ones of said electrodes with alternate polarities of electrical pulse to stimulate shrimp lying in the area between said electrodes to bring the shrimp into a position in front of the net.

14. A shrimp trawl as set forth in claim 13 wherein the ends of said plurality of electrodes are attached to spaced points on said footrope by a swivel and shackle to be easily removed and said first electrode is permanently attached to said footrope.

* * * * *